C. B. WELLS.
TOOL HOLDER.
APPLICATION FILED APR. 6, 1909.
943,499.
Patented Dec. 14, 1909.
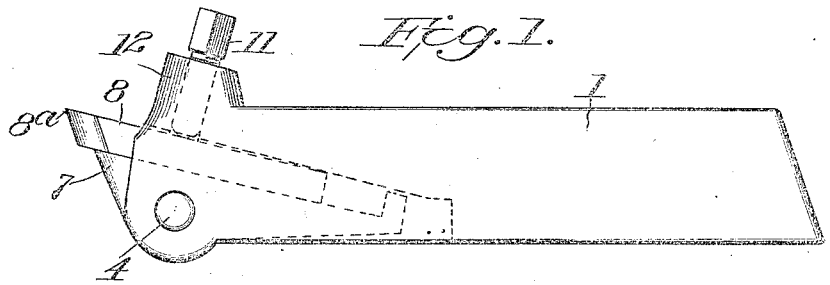
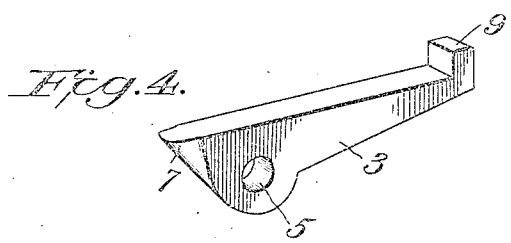
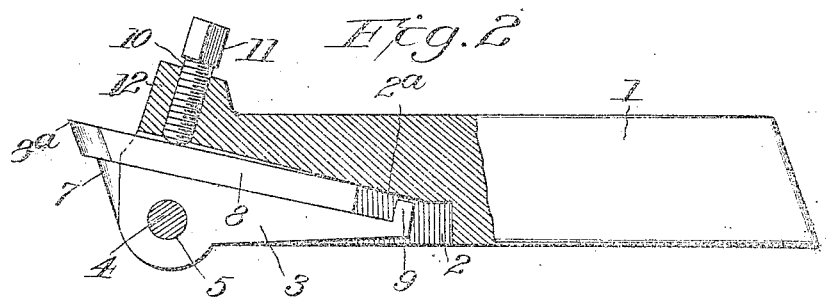
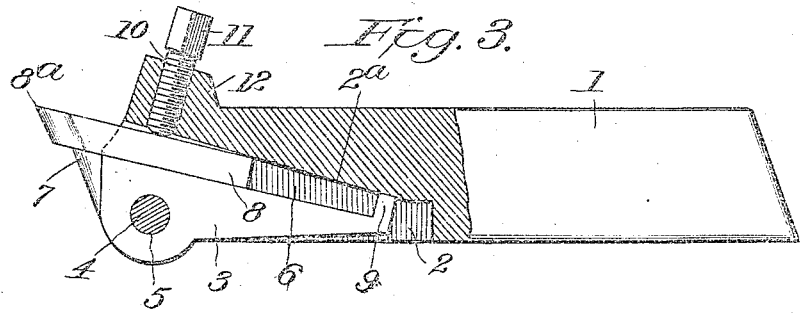
Inventor
Cyrus B. Wells
Witnesses
C. H. Walker
Newton P. Willis
By
Watson & Boyden
Attorneys

UNITED STATES PATENT OFFICE.

CYRUS B. WELLS, OF SCRANTON, PENNSYLVANIA.

TOOL-HOLDER.

943,499.

Specification of Letters Patent. Patented Dec. 14, 1909.

Application filed April 6, 1909. Serial No. 488,317.

*To all whom it may concern:*

Be it known that I, CYRUS B. WELLS, a citizen of the United States, residing at Scranton, in the county of Lackawanna and State of Pennsylvania, have invented certain new and useful Improvements in Tool-Holders, of which the following is a specification.

My invention relates to tool holders, and more particularly to holders for lathe tools. In lathes and machines of this character it is usual to provide a post in which may be adjustably clamped the shank of a tool holder, such holder having at its forward end a slot or groove adapted to receive the tool, and also provided with means for adjustably clamping the tool in such slot.

The object of the invention is to provide improved means for supporting the tool and securing the same in position, whereby chattering or breaking of the tool will be prevented and the durability and efficiency of the device increased.

With the above objects in view, and to improve generally upon the details of such holders, my invention consists in the construction and arrangement of parts hereinafter described, and illustrated in the accompanying drawing, in which, Figure 1 is a side elevation of my improved tool holder complete; Fig. 2 is a central longitudinal section of the same, parts being in elevation, and showing the tool in one of its positions; Fig. 3 is a similar view, showing the tool in a different position; and Fig. 4 is a perspective view of the pivoted tool rest.

Referring to the drawings in detail, my improved tool holder comprises the usual shank or body portion 1, which is adapted to be inserted in the tool post. Formed in the forward end of the holder is a longitudinal groove or slot 2, in which a tool support 3 is adapted to lie. This tool support 3 is pivotally mounted in the groove 2 by means of a pin 4, which passes through an opening 5 in the supporting member 3 and through similar openings in the walls of the tool holder on each side of the groove 2. The bottom edge of the tool support 3 is shaped to conform with the outline of the tool holder so as to give a neat, smooth, appearance.

It will be observed that the member 3 is of insufficient depth to fill the groove 2, and that it forms with the walls of the groove a tool receiving socket 6, in which the tool 8 is adapted to be secured. This tool comprises a straight bar of steel having its forward end ground to form a cutting point, as indicated at 8ª. At the forward end of the member 3 is a tapering nose 7, which is preferably cut to conform somewhat to the shape of the cutting end of the tool and, lying as it does, immediately beneath the working point of the tool, serves to rigidly support the same in position.

In order to clamp the tool against the support 3, I provide a set screw 10, formed with a polygonal head 11, adapted to receive a wrench. This screw is preferably set into a boss 12 formed on the tool holder at the forward end of the same. A stop or tail piece 9, projects upwardly from the rear end of the supporting member 3 a distance slightly less than the thickness of the tool 8. The purpose of this stop will hereinafter appear.

It will now be seen that the pivoted tool support 3 in fact constitutes a lever, having long and short arms, and that this lever may rock or cant about the pivot pin to a limited extent. It will also be observed that the line of action of the pressure exerted by the set screw 10 lies slightly in advance of the pivot pin 4, or in other words, between the pivot pin and the cutting end of the tool. When, therefore, a tool of normal length is inserted into the holder, as shown in Fig. 2, and the set screw 10 tightened down upon the tool, it will be apparent that the tool will be rigidly clamped against the upper face of the supporting member 3, and furthermore, that there will be a tendency to rotate or rock the lever 3 about its pivot pin in such a direction as to cause the long arm of the lever to grip the rear end of the tool firmly between itself and the bottom wall 2ª of the slot 2. Owing to the fact that the length of the stop 9 is slightly less than the thickness of the tool it will be seen that the stop is held out of engagement with the bottom wall of the groove 2, as shown in Fig. 2, the entire pressure being exerted upon the rear of the tool itself. When, however, the tool has become worn and short, as shown in Fig. 3, its rear end lies so near the pivot point that it is no longer clamped between the long arm of the lever and the wall of the groove, but the pressure is taken by the stop 9 coming into contact with such wall. It will be obvious, therefore, that the purpose of this stop is to limit the amount of movement of the tool support on its pivot, and to maintain the same in proper position when the tool has become short.

It will be particularly noted that, whatever the length of the tool, it always rests firmly and squarely against the upper surface of the support, and that the support may rock about its pivot so as to properly adjust itself to the pressure exerted by the screw 10. In this way, abnormal strains in the tool or holder are prevented. Furthermore, it will be seen, practically the entire wear comes upon the support 3 rather than upon the body portion of the holder and, therefore, if the support becomes worn from long use, it may be readily and cheaply renewed.

It will thus be seen that I have provided a very simple and efficient device for firmly and rigidly holding the tool under all conditions, and supporting the same against vibration, and it is thought that the numerous advantages of my invention will be readily appreciated by those skilled in the art.

What I claim is:—

1. In a holder for lathe tools, a body adapted for attachment to the tool post or equivalent fixture of a lathe, a tool supporting lever pivoted to said body, said body and lever having opposed surfaces forming walls of a tool slot, and means upon the body for pressing a tool against the lever in advance of its pivotal point, whereby when the tool extends to the rear portions of the slot, the rear end of the tool becomes gripped by said walls.

2. In a holder for lathe tools, a body adapted for attachment to the tool post or equivalent fixture of a lathe, a tool supporting lever pivoted to said body, said body and lever having opposed surfaces forming walls of a tool slot, and means upon the body for pressing a tool against the lever in advance of its pivotal point, whereby when the tool extends to the rear portions of the slot, the rear end of the tool becomes gripped by said walls, said body and lever having co-acting stop surfaces for holding said walls a definite distance apart, in the outer positions of the tool.

3. In a holder for lathe tools, a body adapted for attachment to the tool post or equivalent fixture of a lathe, said body having a tool-receiving groove, a tool-supporting lever pivoted to said body near the forward end of said groove, and means for pressing a tool against said lever in advance of its pivotal point.

4. In a holder for lathe tools, a body adapted for attachment to the tool post or equivalent fixture of a lathe, said body having a tool-receiving groove, a tool-supporting lever pivoted to said body near the forward end of said groove and means for pressing a tool against said lever in advance of its pivotal point, said lever and body having co-acting stop surfaces for limiting the movement of the lever.

5. In a holder for lathe tools, a body adapted for attachment to the tool-post or equivalent fixture of a lathe, said body having a tool-receiving groove, a tool-supporting lever pivoted to said body near the forward end of said groove and projecting beyond said forward end, and means for pressing a tool against said lever in advance of its pivotal point.

6. In a holder for lathe tools, a body adapted for attachment to the tool post or equivalent fixture of a lathe, said body having a tool-receiving groove, a tool-supporting lever pivoted to said body near the forward end of said groove and projecting beyond said forward end, and means for pressing a tool against said lever in advance of its pivotal point, said lever and body having co-acting stop surfaces for limiting the movement of the lever.

7. In a holder for lathe tools, a body adapted for attachment to the tool post or equivalent fixture of a lathe, said body having a tool-receiving groove, a tool-supporting lever pivoted between the side walls of said groove, near the forward end of the groove, and a clamping device adapted to press a tool against said lever in advance of the pivotal point of the latter.

8. In a holder for lathe tools, a body adapted for attachment to the tool post or equivalent fixture of a lathe, said body having a tool-receiving groove, a tool-supporting lever pivoted between the side walls of said groove, near the forward end of the groove, said lever having a short arm projecting beyond the forward end of the groove.

9. In a holder for lathe tools, a body adapted for attachment to the tool post or equivalent fixture of a lathe, said body having a tool-receiving groove, a tool-supporting lever pivoted at one side of its center to said body and extending lengthwise of the groove, and means for pressing a tool against said lever in advance of its pivotal point.

10. A holder for lathe tools comprising a body portion having a longitudinal, tool-receiving groove, a lever pivoted in said groove and forming a support on which the tool is adapted to rest, means for canting the lever on its pivot and thus clamping the tool between the lever and bottom wall of the groove when the tool is in one position, and a stop for limiting the movement of said lever when the tool is in another position.

11. A holder for lathe tools comprising a body portion having a longitudinal groove, a tool-supporting member pivotally mounted in said groove, means for clamping said tool against said member, such means arranged to bear upon the tool at one side of the pivot point of said member and thus cant the same on its pivot, and abutting stop surfaces on said body portion and member, such surfaces being normally held out of engagement by the tool itself, but serving, when the tool is partially withdrawn, to prevent undue canting of said member.

12. A holder for lathe tools comprising a body portion having a tool-receiving groove, a tool-supporting lever pivoted in said groove, means for clamping the tool against said lever, such means bearing upon said tool adjacent one end of said lever, and a stop carried by the other end of said lever and adapted to abut the bottom wall of said groove to limit the movement of said lever upon its pivot, and maintain the same in proper position.

In testimony whereof I affix my signature, in presence of two witnesses.

CYRUS B. WELLS.

Witnesses:
F. STACKHOUSE,
P. G. SYLVESTER.